Dec. 25, 1928.

C. L. GEORGE 1,696,476

FRICTION DRIVE MEANS

Filed May 19, 1927

Inventor
Charles L. George,

By Owen & Owen,

Attorneys

Patented Dec. 25, 1928.

1,696,476

UNITED STATES PATENT OFFICE.

CHARLES L. GEORGE, OF FINDLAY, OHIO, ASSIGNOR TO THE BUCKEYE TRACTION DITCHER COMPANY, OF FINDLAY, OHIO, A CORPORATION OF OHIO.

FRICTION DRIVE MEANS.

Application filed May 19, 1927. Serial No. 192,508.

This invention relates to friction drive means, and has for its object the provision of a simple, efficient, strong and durable means of this character which will permit relative turning movements of different parts of the drive means when an extraordinary or unusual resistance is offered by one against turning by the other, thereby serving as a safety means to prevent breakage under certain conditions of use.

The invention is fully described in the following specification, and one embodiment thereof illustrated in the accompanying drawings, in which,—

Figure 1:
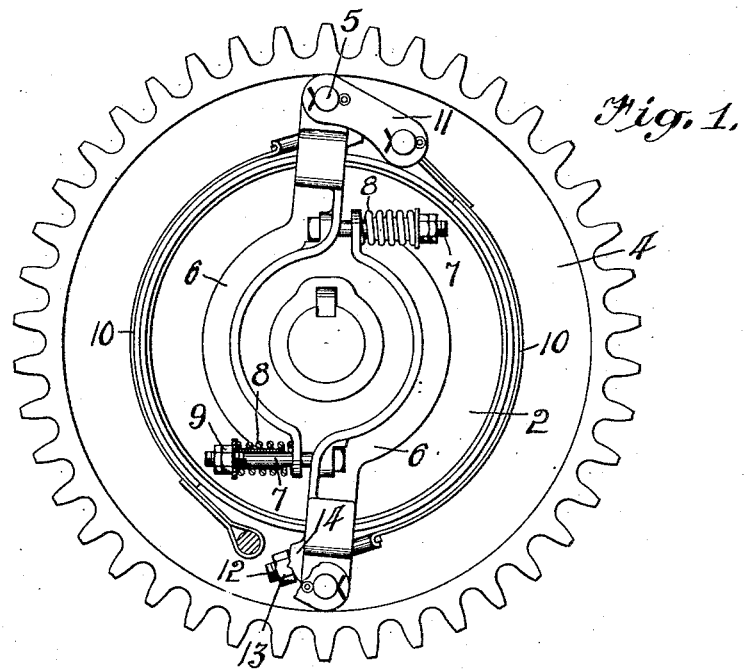
Figure 2:
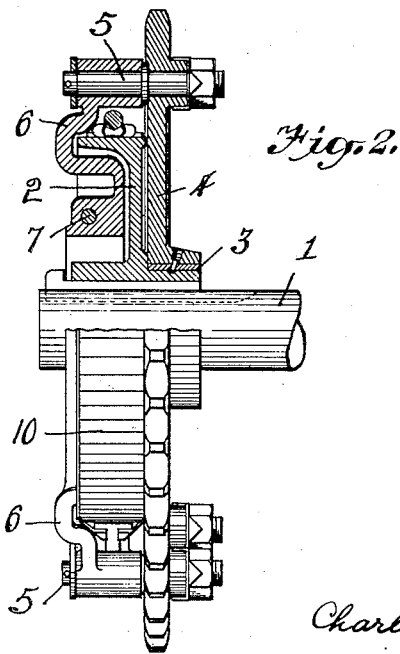

Figure 1 is a side elevation of a device embodying the invention with a part broken away, and Fig. 2 is an edge elevation thereof with a part in section.

Referring to the drawings, 1 designates a shaft and 2 a drum member keyed thereto, in the present instance, for turning movements therewith. One end of the hub sleeve of the drum 2 is extended and forms a bearing 3 on which a member 4 is mounted for turning movements relative to the drum member. The member 4, in the present instance, comprises a sprocket wheel and is of greater diameter than the drum 2, so as to extend radially a distance beyond the periphery of the drum member.

The member 4 has two pins 5 projecting transversely therefrom without the periphery of the drum 2 at diametrically opposite sides thereof, and an arm 6 is pivotally carried at its outer end by each pin 5 and projects inwardly therefrom around the rim portion of the drum and to the opposite side of the drum axis. The inner end portions of the arms are oppositely bowed to extend around opposite sides of the adjacent hub end portion of the drum. The free end of each arm 6 is connected by a bolt 7 to the adjacent portion of the other arm, and a coiled expansion spring 8 is mounted on the bolt between the free end of the arm through which it extends and a nut 9 on the bolt, thus enabling the two arms to have yielding movements away from each other and the tension of the spring to be varied by a turning of the nut 9.

A friction-band 10 is anchored at one end to each pin 5 through the medium of a link 11 and extends therefrom, in the present instance, in a clockwise direction around the periphery of the drum in frictional engaging relation thereto and has its opposite end adjustably connected to the other pin 5 through the inner end portion of the arm 6 carried by such pin. For the purpose of adjustment, the free end of the band 10 is provided with a longitudinally projecting threaded stud 12 which projects between the drum periphery and the respective pin 5 and carries a nut 13 in engagement with a thrust portion 14 (Fig. 1) on the opposite side of the associated arm 6.

It is apparent that a tightening of the nut 13 on the band stud 12 will tend to tighten the band against the periphery of the drum and will also exert a pressure against the associated arm 6, tending to move said arm away from the other arm against the tension of both springs 8 connecting said arms.

In practice, either member 2 or 4 may serve as the drive member and power be communicated therefrom to the other member through the frictional engagement of the bands 10 with the drum member. This manner of connecting the two members provides a simple and efficient means of frictionally driving one from the other, which means is adjustable to vary the tension of the friction bands on the drum member and at the same time equalizes the pressure of the two bands, due to the yielding connection of the two arms to which the separate bands are connected.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. In a device of the class described, a drive member and a driven member, one constituting a friction drum, a plurality of friction bands engaging the friction drum and anchored to the other of said members to turn therewith, means connecting said bands including members connected to the free ends of the friction bands and extending from opposite sides substantially diametrically across said friction drum in lapping relation, and a yieldable connection between the inner end portion of each member and adjacent member, thereby to equalize the pressure of the bands on the drum.

2. In a device of the class described, coaxial relatively rotatable drive and driven members, one having a frictional peripheral surface, a plurality of friction bands arranged in successive order around the friction member in engagement therewith and each having a corresponding end thereof anchored to the other member for turning movements therewith, the free ends of said bands being substantially diametrically opposed to each other, and means carried by and extending diametrically across said last-mentioned member and connecting said free ends and serving to equalize the pressure of the bands on the friction member.

3. In a device of the class described, coaxial relatively rotatable drive and driven members, one having a peripheral frictional surface, a plurality of friction bands extending in successive order around the friction member in engagement therewith and each having a corresponding end anchored to the other member, and means carried by said last-mentioned member and having adjustable connection with the free end of each band, whereby the tension of the band on the friction member may be adjusted and equalized, said means comprising an arm for each band pivotally anchored at one end to the member to which the bands are anchored and extending across the friction member transverse to its axis and yieldingly connected to the other arm.

4. In a device of the class described, a pair of relatively rotatable members having a common axis and one constituting a friction member, a pair of friction bands extending in successive order around the friction member in engagement therewith and each anchored at a corresponding end to the other member, an arm associated with each of said bands and connected at one end to the member to which the respective band is anchored adjacent to its anchoring point and projecting therefrom across the side of the friction member transverse to its axis with one arm disposed in lapping relation to the other arm, means yieldingly connecting the free end of each arm to the adjacent portion of the other arm, and means connecting the free end of each band to the inner end portion of the adjacent arm.

5. In a device of the class described, a pair of coaxial relatively rotatable members disposed side by side and one being diametrically larger than the other, pins projecting transversely from the side of the larger member at opposite sides of its axis and without the periphery of the other member, friction bands extending in the same direction around the periphery of the smaller member in frictional engagement therewith and each anchored at a corresponding end to a respective one of said pins, an arm pivotally projecting inwardly from each pin across a side of the smaller member transverse to its axis with the free ends of the arms disposed at opposite sides of said axis in lapping relation to each other, a yielding connection between the free end of each arm and the adjacent portion of the other arm, and means adjustably connecting the free end of each band to a respective arm adjacent the pivoted end thereof.

In testimony whereof I have hereunto signed my name to this specification.

CHARLES L. GEORGE.